Oct. 18, 1966   L. ALFILLE ETAL   3,280,003
FUEL ELEMENT FOR NUCLEAR REACTORS WITH PRESSURE TUBES
Filed April 10, 1963                                    3 Sheets-Sheet 1

INVENTORS
Lucien ALFILLE
Jean BRIOLA
Jacques DUFRESNE
Eggert OHLMER

ATTORNEYS

INVENTORS
Lucien ALFILLE
Jean BRIOLA
Jacques DUFRESNE
Eggert OHLMER

United States Patent Office 3,280,003
Patented Oct. 18, 1966

3,280,003
FUEL ELEMENT FOR NUCLEAR REACTORS
WITH PRESSURE TUBES
Lucien Alfille, Brussels, Belgium, and Jean Briola and Jacques Dufresne, Varese, and Eggert Ohlmer, Velate, Varese, Italy, assignors to Communaute Europeenne de l'Energie Atomique-Euratom, Brussels, Belgium
Filed Apr. 10, 1963, Ser. No. 271,916
Claims priority, application Italy, Apr. 17, 1962, 70/224
8 Claims. (Cl. 176—43)

The present invention relates to the fuel element of the nuclear fuel load of a heavy water moderated reactor cooled by a fluid flowing under pressure in the reactor channels constituted by cold pressure tubes, the fuel element comprising essentially a cylindrical external jacket housing a set of parallel bars made of fissile material and transverse cross-brace structures for supporting and spacing the bars, which members are secured to the jacket.

As is known, these fuel elements are preferably used in reactors having pressure tubes on account of the substantial heat reduction which is obtained by dividing the fissile material into fractional bars and because of their high mechanical properties which increase the resistance under irradiation at high combustion rates.

These fuel elements, which must be stacked one above the other in each reactor channel to form a pile, can easily be handled during loading and unloading of the channels because their structure is rigidified by an external jacket. The guiding and centering of the fuel elements in the channels and the positioning thereof in the cooling fluid stream are facilitated.

The structure of the fuel elements, rigidified by the jacket, serves also to preserve the fuel bars against the harmful effects of thermal and/or mechanical stresses.

The present invention relates to fuel elements of the above mentioned type which are adapted to be used in reactors having cold pressure tubes.

These cold pressure tubes are so called because they are substantially at the same temperature as that of the moderating fluid into which they are immersed. Inside the tube is a thermal screen by means of which it is protected against the heat produced by the fuel, the screen being immersed in the cooling fluid stream. A second tube called guiding tube is received within the pressure tube, the guiding tube having, fixed to its external surface, the thermal screen adapted to occupy the annular space between the two tubes. This guiding tube extends the full length of the pressure tube and serves not only as support for the thermal screen but acts also as a guiding and centering seat for the cell jackets and as a means for concentrating the cooling fluid stream in the channel zone occupied by the stacked fuel bar clusters.

Because of the presence, inside the channel, of the thermal screen and of the guiding tube, this cold pressure tube tructure has a reduced loading cross-section in the case of predetermined transverse dimensions.

The effective useful cross-section is again reduced by the necessity to provide assembling means, for the jackets inserted into the guiding tube, in order to take into account the thermal expansion and the construction geometric tolerances of the tube, in view of its great length.

An even more important drawback of these structures is the fact that their guiding tube and screen constitute, in practice, elements of reactors which are permanent or at least long lasting.

If it is indeed considered that the entire life of a reactor is from 15 to 20 years, it is not possible to remove and replace the insulated guiding tube before the 7th or 10th year of operation of the reactor in view of the excessive cost of such an operation. It is, indeed, necessary to remove its moderator, to take out the fuel, to reach for the structures to be replaced and then clean up in order to set up the new guiding tubes and the new insulating material.

For this reason, the materials constituting the guiding tube and the thermal screen, provided for extended periods of operation at full load, must have excellent mechanical as well as nuclear qualities which considerably raises the cost thereof.

An object of the present invention resides in the provision of a fuel element of the above mentioned type which is of a new and simple conception and which obviates the drawbacks of the pressure tubes for which it is intended, by substantially simplifying the structures of the said tubes.

Another object of the present invention consists in providing a fuel element intended for the building up of a load of a reactor channel constituted by a cold pressure tube, provided with a thermal insulating sheet which cooperates, within the load formed by the assembly of fuel elements, with other similar fuel elements to make up the thermal screen for the pressure tube and concentrate the flow of cooling fluid inwardly of the jackets so as to constitute the guiding tube.

A further object of the invention resides in the provision of such a fuel element provided with means for axially clamping the insulating sheet wound around its external surface, during the necessary movements for the loading and/or unloading of the channel.

A still further object of the invention consists in providing such a fuel element wherein the parts coming in contact with two adjacent fuel elements are adapted to provide a tight assembly which also ensures the proper transmission of stresses to which the fuel element itself may be subjected.

Yet another object of the invention is to provide the said fuel elements with means, in connection with the parts providing the mutual tight assembly, making it possible to prevent the cooling fluid from coming in contact with the cold wall of the pressure tube, in the case of local leaks.

It is also an object of the invention to provide such a fuel element with means for the automatic alignment of the cooling fluid streams between the different cluster bars constituting the load of the channel, during the mounting of the cells in the said channel.

Finally, another object of the invention is to provide such a fuel element with devices capable of ensuring equilibrium between the internal and external pressures of the cooling fluid.

The fuel element of the invention is characterized in that it comprises, preferably at the ends thereof, means for axially maintaining and/or containing a thermal insulating sheet wound around the external surface of the jacket and means for tightly assembling the fuel element with other similar fuel elements, this being done in such a way that in making up the load in the pressure tube, the sheathings of the fuel elements define a substantially continuous thermal screen adhering to the internal wall of the pressure tube and in that the jackets define a continuous tube within which is concentrated the cooling fluid stream.

In accordance with a further characteristic of the invention the fuel elements comprises an annular element at one end thereof adapted to surround, with insertion of an annular sheet, the end of the coupled fuel element, the said element being part of the fuel element and being added to or secured thereto, while forming a screen to prevent the formation or the deviation in the direction of the cooling fluid streams directed outwardly of the fuel element.

A further characteristic consists in that the ends of the fuel element are provided with toothed members for meshing with corresponding complementary members of adjacent fuel elements, these members being so made up that when a fuel element engages with the preceding one, the coupled complementary members create a reactive torque which forces the fuel elements to make a rotation giving it a predetermined angular position.

Other characteristics and features of the invention are illustrated, by way of a non-limitative example, in the appended drawings wherein:

FIGURES 1 and 2 diagrammatically illustrate the structure of a known cold pressure tube and that of a tube of the same type wherein the fuel load is made up according to the invention;

Figure 1:
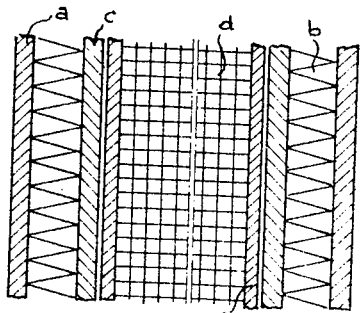

Considering first the diagram of FIGURE 1, it is noted that the structure of known cold pressure tubes comprises, from the outside inward, a pressure tube $a$ which supports the cooling fluid pressure, immersed in the heavy water moderator, the thermal screen $b$ in contact with a practically stationary cooling fluid, the guiding tube $c$ over which is secured the screen $b$ and the function of which it is to concentrate the cooling fluid to a stream and, finally, the fuel clusters $d$ stiffened by jacket $e$.

Figure 2:
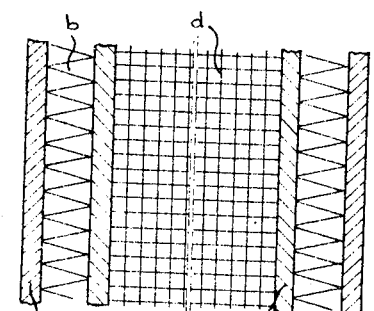

Considering now FIGURE 2 and, according to the present invention, it may be noted that the structure of the pressure tube is simplified by the elimination of the guiding tube and that, in order to support the thermal screen and concentrate the cooling fluid into a stream, the channel defined by superposed jackets $e$ is used.

Figure 3:
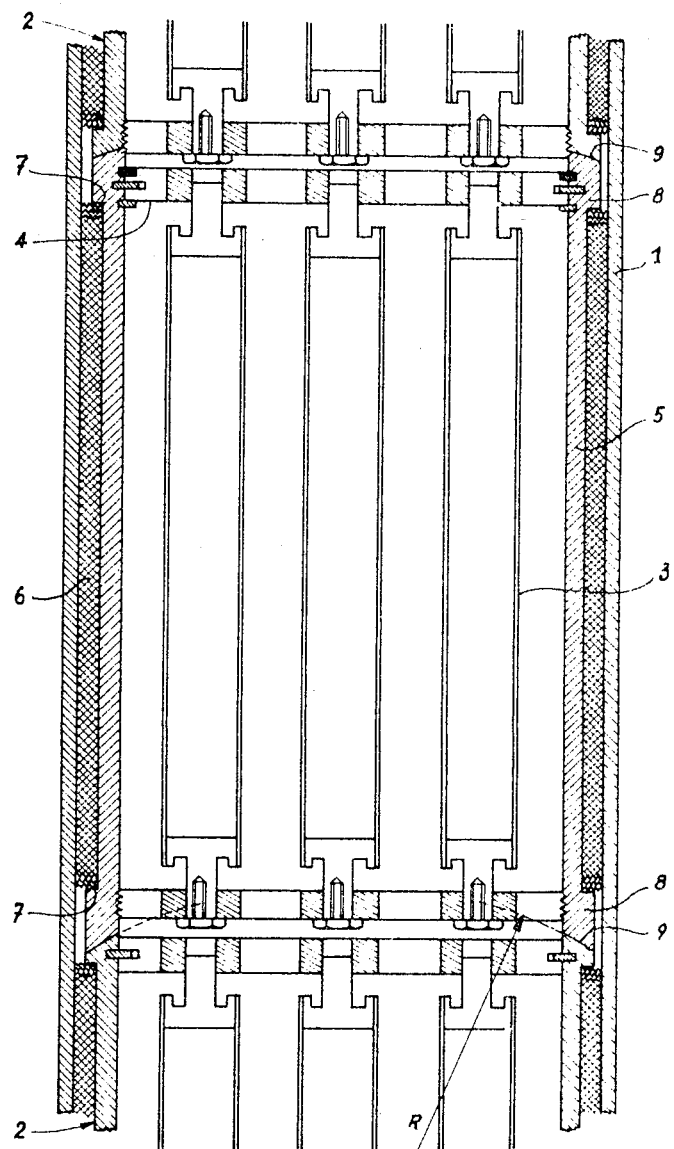
FIGURE 3 is a longitudinal cross-section of a pressure tube wherein the fuel elements are illustrated according to a first embodiment.

Turning now to a practical embodiment, as shown in FIGURE 3, 1 designates a cold pressure tube defining one of the vertical or horizontal channels of the reactor, immersed in the heavy water moderator and by 2 the fuel elements which make up the channel load.

The cluster rods are identified by numeral 3 and their ends are mounted on cross-brace members 4 secured to jacket 5.

The latter is constituted by a cylindrical tube made of graphite of nuclear quality or of heat resistant metal such as beryllium, aluminum or calcined magnesium, or ceramic material such as alumina, magnesia or vitreous silica.

According to the invention, jacket 5 of fuel element 2 is surrounded with a layer of thermal insulation 6 wound on the jacket between shoulders 7 defined by annular flanges 8 forming the ends of the jacket.

Layer 6 fills the annular chamber comprised between jacket 5 and tube 1 and projects beyond shoulders 7 which retain it against the jacket during insertion and extraction of fuel elements 2 in or out the channel during the loading and unloading thereof.

The cooling fluid stream is created by connecting jackets 5 end to end by means of complementary bearing surfaces 9 having a radius R permitting a certain eccentricity in the jackets.

This arrangement makes it possible to obtain a substantial bearing surface by means of which all stresses may be properly distributed and transmitted, such stresses resulting from the load losses of the cooling fluid and those due to the weight of the load of the supposedly vertical channel. It also makes it possible to obtain a satisfactory contact ensuring tightness between the fuel elements, thus avoiding cooling fluid leaks in the direction of the cold wall of the pressure tube.

Figure 4:
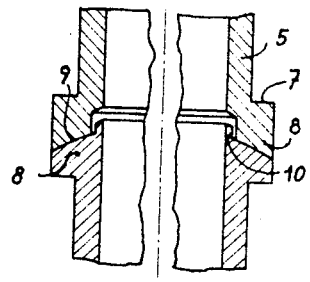
FIGURES 4 and 5 are cross-sectional views of two jackets provided with a deflector.
Figure 5:
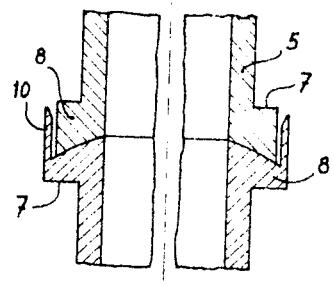

In order to avoid that the same inconvenience may happen because of local leaks between surfaces 9, one of the two coupled ends 8 is provided internally, as shown in FIGURE 4, or externally, as illustrated in FIGURE 5, with a deflector made up by a thin annular projection or ledge 10 which extends in the direction of the fluid flow and surrounds the corresponding coupled end 8 over a certain length.

According to the embodiment of FIGURE 5, deflector 10 is provided within the annular chamber formed between jackets 5 and tube 1 wherein the cooling fluid is stagnant or flows very slowly as a result of the difference in pressure existing between the inlet and outlet of the channel, the deflector breaking up the radial path of an eventual stream of cooling fluid directed outwardly.

Figure 6:
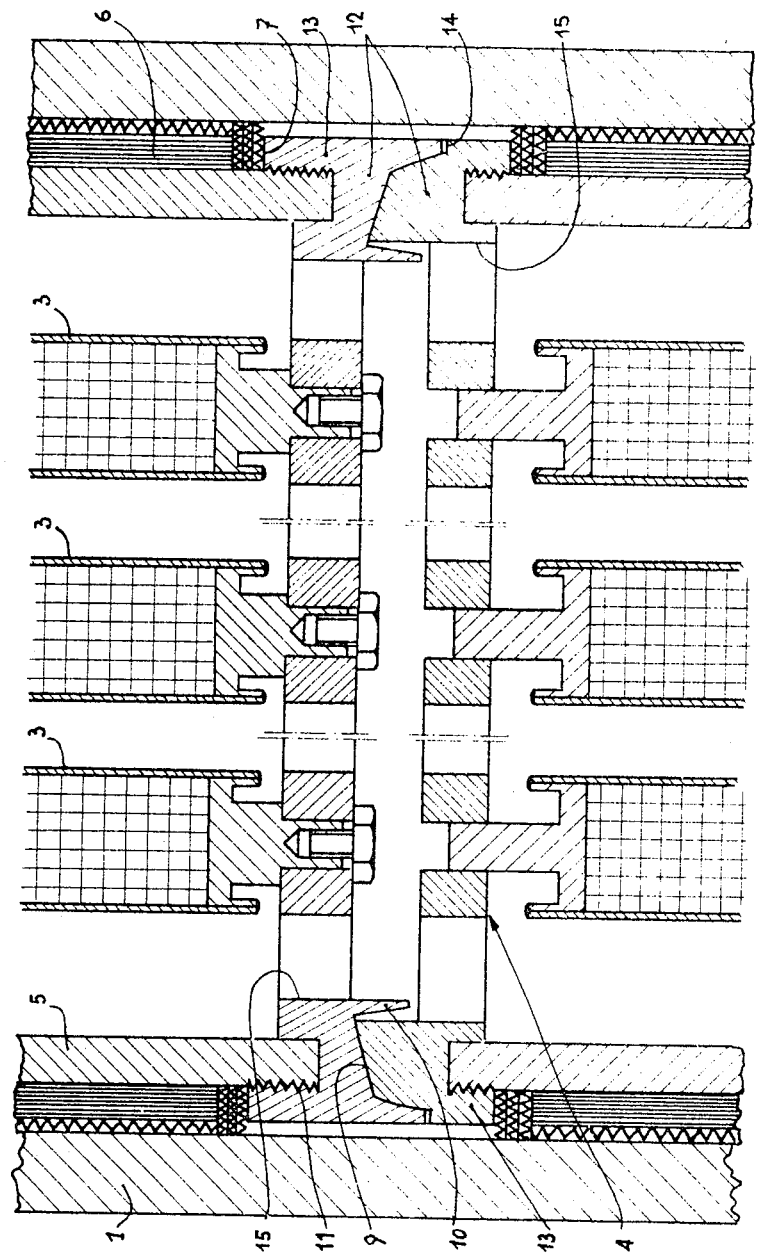
FIGURE 6 is a longitudinal cross-section similar to that of FIGURE 3 illustrating a second embodiment of the invention.

A modification of the embodiment of the fuel elements is illustrated in FIGURE 6 wherein the same reference numerals identify corresponding parts.

According to this embodiment, jackets 5 are threaded on the peripheral annular band 12 of cross-brace members 4 by means of threads 11.

Band 12 terminates outwardly of jacket 5 by a circular crown 13 which defines the shoulder 7 for the thermal insulating layer 6.

These bands 12 as well as flanges 8 of the embodiment shown in FIGURE 3 define spherical bearing surfaces 9 and deflector 10.

Figure 7:
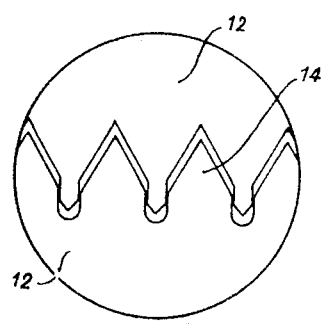
FIGURE 7 illustrates a detail of a gearing system such as is provided in the fuel elements of FIGURE 6.

On the ends opposite shoulders 7, bands 12 of the coupled cross-brace members are provided with complementary indentation in the form of saw teeth 14 as is illustrated in FIGURE 7.

The pitch of the indentation and its peripheral distribution on crown 12 are chosen in relation to the axis of symmetry of the cluster of rods 3 in such a manner that, when unloading of the channel has been carried out, the analogous rods of two continuous clusters are in line on the same axis.

This arrangement ensures automatic remote alignment of the cooling fluid streams through passages 15 formed in thte cross-brace members and which are brought to closely adhere by mechanical action applied at the end of the channel and under the action of the weight of the upper fuel elements, if the channel arrangement is vertical.

In other words, such an arrangement is used in order to angularly dispose each channel in relation to the preceding one in such a manner as a limit the load losses in regard to the coupled ends and to avoid sinuous path for the cooling fluid.

As can be derived from FIGURE 7, the indentations exclusively serve to obtain an automatic setting of one fuel element over the other since this creates, by reason of the particular design of the teeth, a torsion couple of one fuel element on the next one which is then forced to center itself before bearing on joint 9 which carries all by itself the axial compression load.

Figure 8:
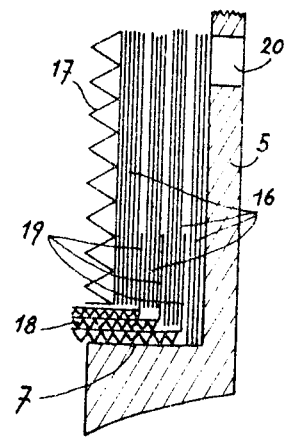
FIGURE 8 illustrates a detail of the insulating sheet of the fuel element.

FIGURE 8 illustrates the thermal layer in detail as constituted by alternate layers 16 of vitreous silica and aluminum or steel sheets or bands, wound in helices with an abutting pitch or in overlapping fashion on the outer surface of jacket 5 or by layers constituted by thin oxidized metal sheets on the two faces, such as aluminum-alumina or zirconium-zirconium oxide.

The most outwardly of the windings is made up by folded or molded bands 17 which wrap against tube 1 while substantially reducing the flow of fluid in the annular zone next to the tube due to the load loss in the channel.

Layers 16 and 17 bear against shoulder 7 through flexible rings 18 provided with channelling obtained by folding or by molding thin sheets of stainless steel or zirconium and which are welded to one another and secured on the insulating layers by means of fingers 19 inserted between the latter.

In certain cases, it may be necessary to provide on layer 6, a more external layer, not illustrated, and made up by a bent helically wound with overlapping or spot welded, or by two helical layers wound in reverse direction in such a manner as to make up a protective sheet during movement of the fuel elements in the channel.

As illustrated in FIGURE 8, the jacket may be provided with holes 20, arranged with proper spacing between each other and in relation to the ends of the jacket.

This arrangement makes it possible to balance the forces acting inside and outside of the jacket by avoiding that the latter be subjected to stresses due to the difference in pressure between the inlet and the outlet of the cooling fluid.

This arrangement of holes 20 on a central zone of the jacket places into communication the central useful stream of cooling fluid with that part of the fluid which is retained between the layers of insulating sheathing.

The hot fluid, which traverses holes 20 in small quantity, thus opens up on the internal surface of layer 6 and, by being heavily laminated between the successive layers, it is prevented from coming directly into contact with the cold wall of the pressure tube.

It should be noted that the elimination of the guiding tube makes it possible to reduce the transverse dimensions of the channel by at least 5 or 6 mm. and that, besides, it is not necessary to provide, for the assembly, the structures which are necessary, in known embodiments, for the fuel elements.

This makes it possible to use, for a given internal diameter of the pressure tube, a greater useful section of the loading pile of the channel and to obtain, for a given pile cross-section, a reduction in the diameter of the pressurized tube and therefore of its thickness if a maximum pressure has been fixed before the cooling fluid.

In all cases, an appreciable gain in reactivity is obtained.

This gain is also increased by the reactivity which, in known embodiments, is absorbed by the guiding tube which usually is a structure subjected to heavy thermal and mechanical stresses.

It should furthermore be noted that, in the structure proposed in the instant application, the presence of the thermal insulation in the reactor is practically limited to the impoverishment period of the fuel, that is to a period in the order of 6 months to a year, for instance.

This makes it possible to use thermal insulation of low quality, for instance in regard to the resistance to mechanical fatigue, to corrosion, to irradiation, or else to use materials having a better nuclear quality but having a shorter life duration due to corrosion.

The invention has been described in reference to particular embodiments; it should however be obvious that it is not limited to the latter and that modifications may be made thereto without departing from the spirit of the invention.

For instance, deflector 10 of FIGURE 5 may be derived from a structure forming the peripheral thermal sheathing and may also be obtained by means of an annulus secured on the external face of flange 8 or again by means of a sleeve slipped over the latter.

Besides, instead of indentation 14 at the periphery of cross-brace members 4, conical male and female members having corresponding indentations may be provided on the cross-brace members and at the center thereof.

Furthermore, it should be well understood that the jackets are of ceramic material, their assembly being obtained by means of a plastic joint disposed between the corresponding ends and which may also form a part of the structure of the cross-brace members.

We claim:
1. In a nuclear reactor moderated by heavy water, the combination comprising:
   (a) a moderator tank and heavy water in said tank;
   (b) a plurality of pressure tubes extending across said tank and immersed in said heavy water;
   (c) a plurality of fuel element cartridges, stacked into each of said pressure tubes, each cartridge comprising:
      a hollow cylindrical structural casing mounted in a pressure tube in spaced relationship to define therewith an annular chamber;
      a solid thermal insulating sheath mounted over the external surface of said casing and into said chamber;
      radial flanges projecting outwardly from the ends of said casing to retain said sheath on said casing;
      a cluster of rods of fissile material in said hollow casing of a length about equal to said casing; said casing for supporting said cluster and for guiding and centering the cartridge in the pressure tube, means secured to said casing for holding and spacing said rods therein, whereby said cluster of rods and solid insulating sheath form a replaceable unit which may be placed and removed bodily in the respective pressure tube;
      cooperating coupling means at each end of said casing whereby said fuel element cartridge may form part of a stack of other such fuel element cartridges.

2. A combination as claimed in claim 1 including an annular ledge on one of said coupling means projecting axially and outwardly of said casing circumscribing the end of the casing of the adjacent fuel element cartridge to which it is coupled.

3. A combination as claimed in claim 1 wherein at least part of the outer edges of said flanges terminates short of the outer surface of said solid insulating sheath whereby the anular insulating sheath containing chamber of a fuel element cartridge communicates with the corresponding chambers of adjacent fuel elements cartridges 4. In a nuclear reactor moderated by heavy water and having a plurality of pressure tubes extending through the heavy water, replaceable fuel element cartridges slidably received in stack formation in each of said pressure tubes, each fuel element cartridge comprising:
   (a) a cluster of rods of fissile material;
   (b) a hollow cylindrical structural casing for supporting said cluster and for guiding and centering the cartridge in the pressure tube, said casing having a length about equal to said rods;
   (c) means secured to said casing for holding and spacing said rods therein;
   (d) a solid thermal insulating sheath mounted on the external surface of said casing and of a thickness to contact the inner wall of the respective pressure tube;
   (e) means projecting outwardly from the ends of said casing to define therewith and with the inner wall of the respective pressure tube an enclosure housing and retaining said sheath axially of said casing whereby said cluster of rods, casing and solid insulating sheath form a replaceable unit, and
   (f) cooperating coupling means at each end of said casing coupling said fuel element cartridge to adjacent fuel element cartridges.

5. A replaceable fuel element cartridge as claimed in claim 4 wherein said outwardly projecting means are radial flanges terminating short of the inner wall of the respective pressure tube for the free flow of cooling fluid between enclosures of adjacent fuel element cartridges and there is provided an annular ledge on one of said coupling means circumscribing the end of the casing of the adjacent fuel element cartridges to which it is coupled.

6. In a nuclear reactor having at least one channel in the form of a pressure tube immersed in a heavy water moderator and a stack of fuel element cartridges in said pressure tubes each having an outer cylindrical structural casing surrounding and containing a cluster of fuel rods and the holding and spacing means therefor, wherein the fuel element cartridges are stacked in succession to allow the flow of a cooling liquid longitudinally of the fuel element cartridges and wherein there is provided solid heat insulating material to hold the pressure tube at a substantially lower temperature than the cooling liquid, characterized in that the solid heat insulating material is mounted outwardly around the cylindrical casing and forms therewith a replaceable unit.

7. A replaceable fuel element cartridge as claimed in claim 4, wherein the extreme ends of each structural casing are formed with peripheral axial teeth adapted to coact with peripheral teeth of adjacent structural casings, whereby the fuel element cartridges will take on a predetermined position during assembly thereof.

8. A replaceable fuel element cartridge as claimed in claim 4, wherein the jacket is provided, inwardly of the ends thereof, with a series of wall aperture for the cooling fluid whereby to balance the fluid pressure inwardly and outwardly of the structural casing.

References Cited by the Examiner

UNITED STATES PATENTS

| | | | |
|---|---|---|---|
| 2,868,708 | 1/1959 | Vernon | 176—52 X |
| 2,915,446 | 12/1959 | Liljebad | 176—58 |
| 2,977,297 | 3/1961 | Evans et al. | 176—52 X |
| 3,071,527 | 1/1963 | Young | 176—52 |
| 3,079,321 | 2/1963 | Oppenheimer et al. | 176—52 |
| 3,088,897 | 5/1963 | Fawcett et al. | 176—64 |
| 3,090,743 | 5/1963 | Alfille | 176—58 X |
| 3,099,616 | 7/1963 | Bauer et al. | 176—52 |
| 3,104,218 | 9/1963 | Speidel et al. | 176—58 X |
| 3,108,053 | 10/1963 | Vrillon et al. | 176—58 X |
| 3,165,449 | 1/1965 | Bradley | 176—60 X |

FOREIGN PATENTS

| | | |
|---|---|---|
| 647,974 | 9/1962 | Canda. |
| 897,457 | 5/1962 | Great Britain. |
| 359,214 | 2/1962 | Switzerland. |
| 341,918 | 12/1959 | Switzerland. |

L. DEWAYNE RUTLEDGE, *Primary Examiner.*

REUBEN EPSTEIN, CARL D. QUARFORTH,
*Examiners.*

R. L. GRUDZIECKI, *Assistant Examiner.*